Aug. 11, 1959 J. W. WILLIAMS III 2,899,615
LINEAR MOVEMENT REMOTE CONTROL SERVOSYSTEM
Filed May 7, 1953 5 Sheets-Sheet 1

INVENTOR
James W. Williams, 3rd.
BY
ATTORNEYS.

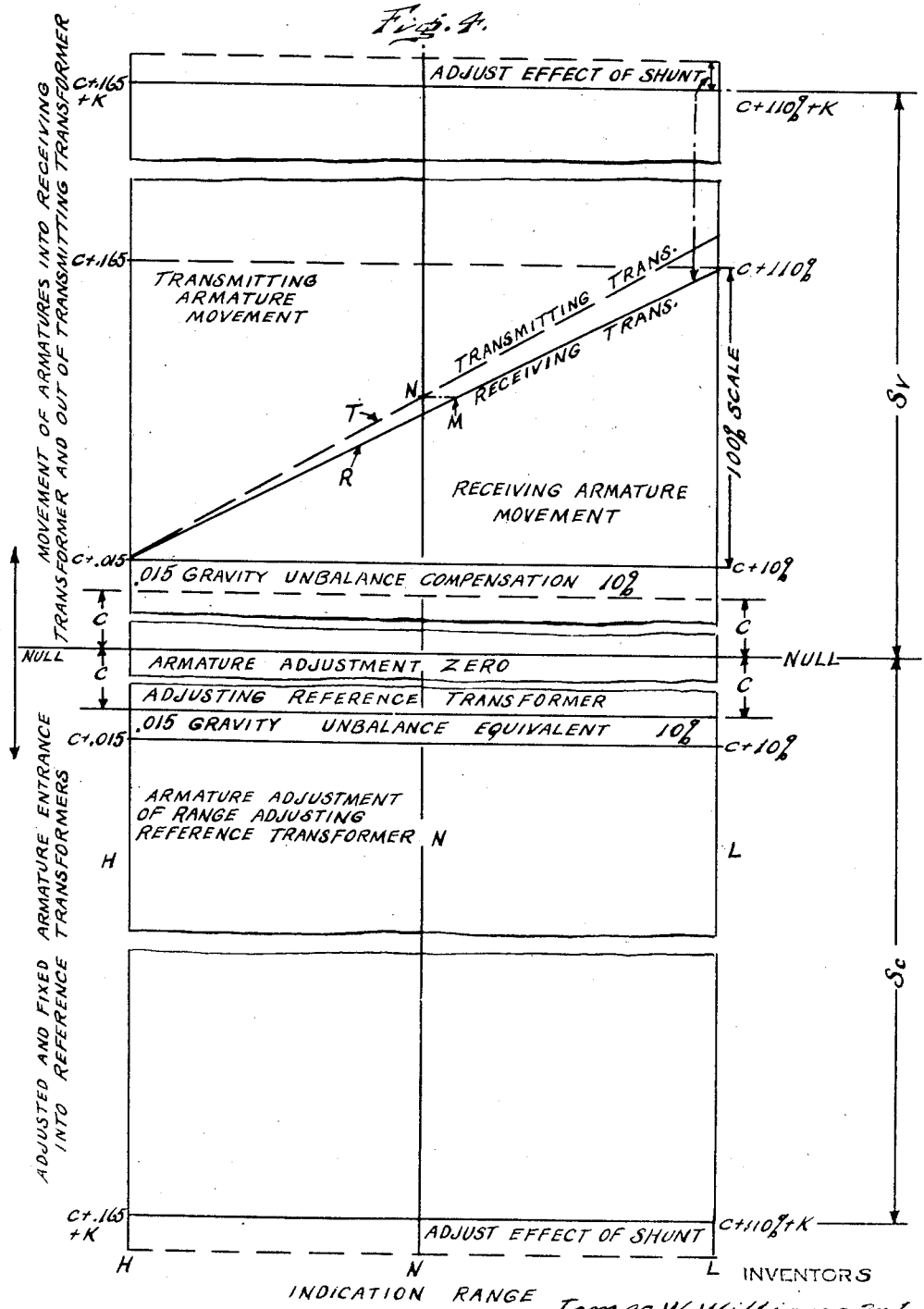

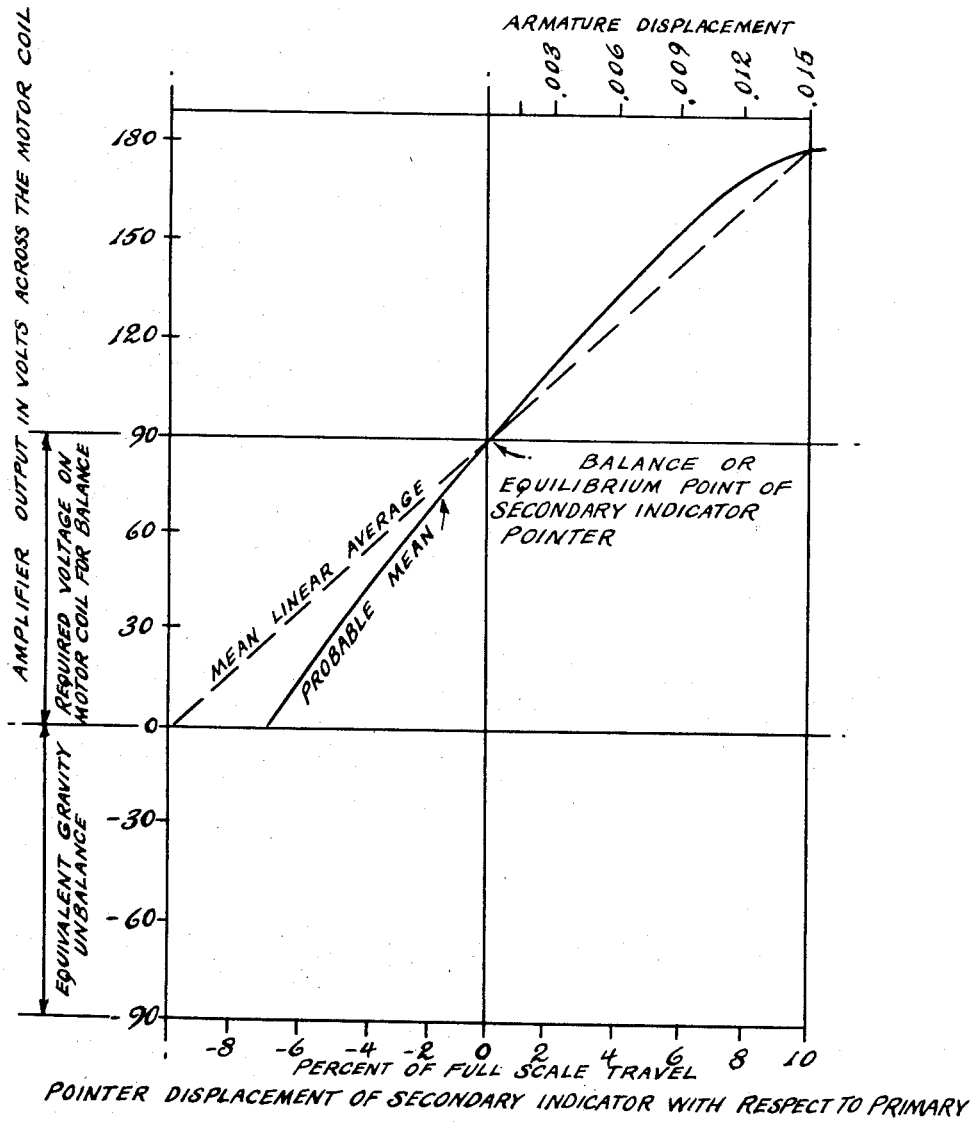

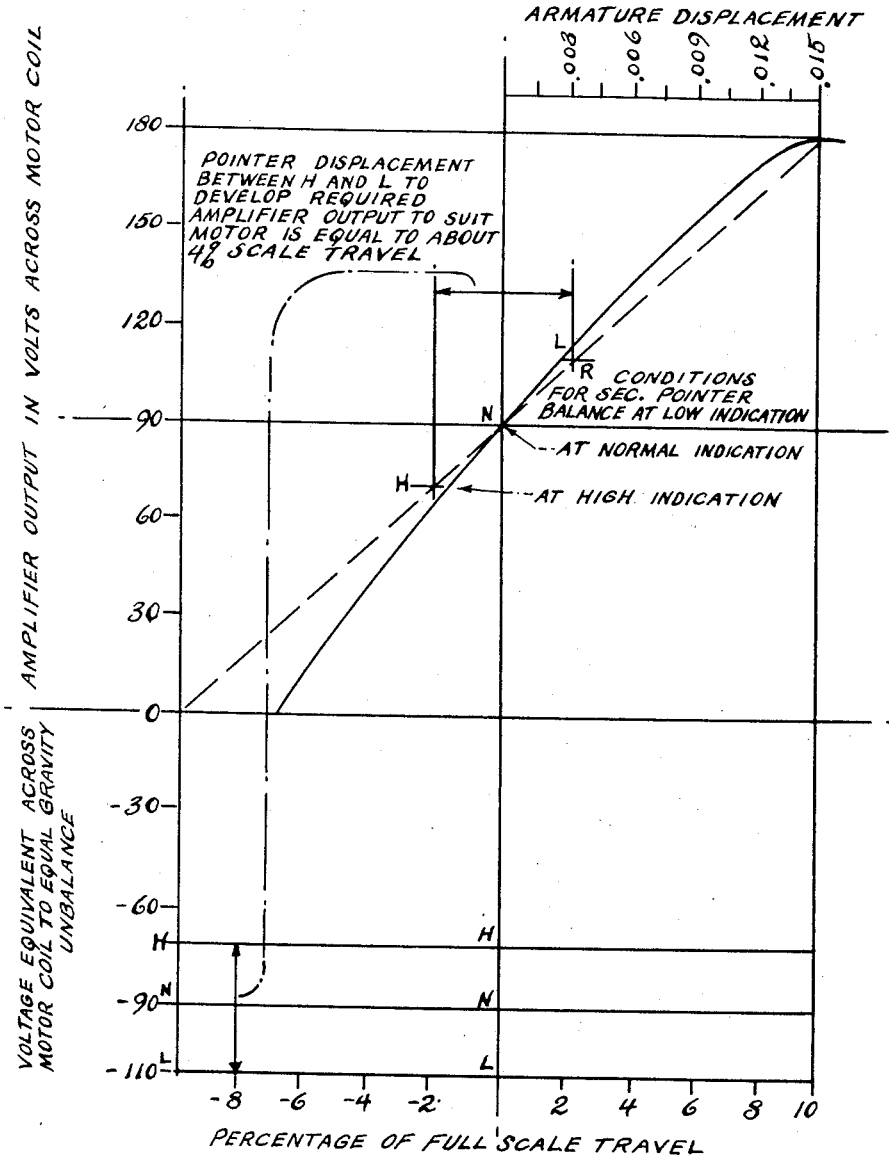

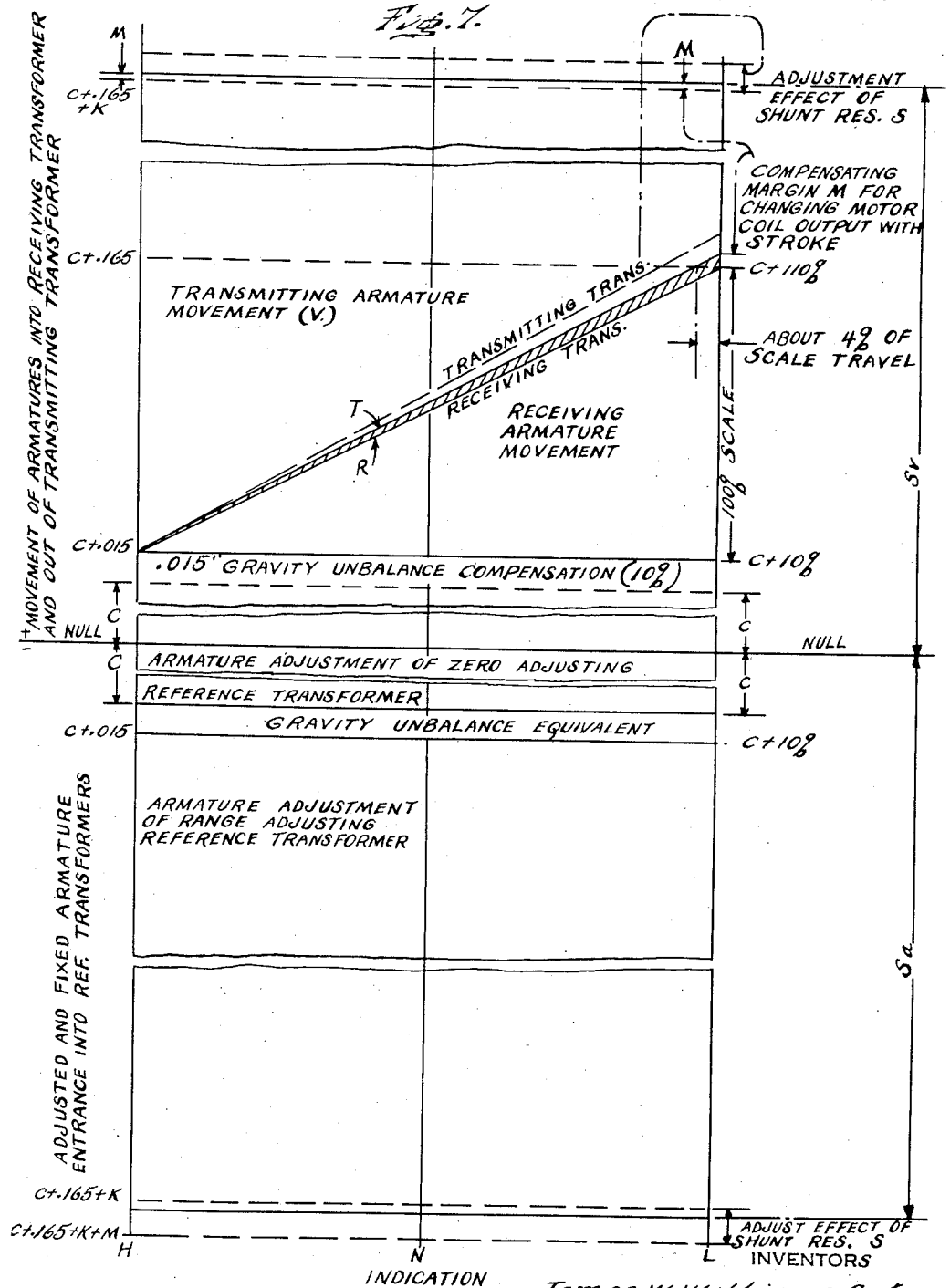

United States Patent Office 2,899,615
Patented Aug. 11, 1959

2,899,615

LINEAR MOVEMENT REMOTE CONTROL SERVOSYSTEM

James W. Williams III, Lansdale, Pa., assignor to Yarnall-Waring Company, Philadelphia, Pa., a corporation of Pennsylvania Application May 7, 1958, Serial No. 733,534

23 Claims. (Cl. 318—22)

The present invention relates to electrical remote system of the type which may be used for remote indicator systems and the like.

The present application is a continuation-in-part of my copending application Serial No. 671,153, filed July 11, 1957 for Remote Electrical System, now abandoned.

A purpose of the invention is to produce an electrical remote system which can operate with precision without the necessity of employing electrical components and mechanical compensation of high precision, and without the need for close control of the turns on coils and the like.

A further purpose is to maintain a predetermined approach to electrical balance between a fixed reference output from a reference transformer or transformers acting in one phase direction and the combined variable output of transmitter and receiving transformers acting in the opposite phase direction.

A further purpose is to bias the secondary indicator towards one direction of pointer motion and operate the pointer by the amplified signal of a transmitting transformer added to that of a receiving transformer and opposed by that of one or more reference transformers.

A further purpose is to make a remote electrical system insensitive to change in alternating current line voltage.

A further purpose is to provide for rapid and reliable adjustment both for range and zero of the secondary indicator by electrically adjusting the current in a shunt across one of the coils of the transmitting transformer in series with one of the coils of the range adjusting reference transformer.

A further purpose is to provide for motion of the structure or core of the transmitting transformer into the coils at the same time that the receiving transformer armature or core moves out of its coils, and vice versa.

A further purpose is to connect the transmitting and receiving transformer in additive electrical output relation, but to reverse the direction of the transformer armature movement at the transmitter as compared to the receiver so as to maintain a constant total electrical output at all registry positions.

A further purpose is to gravity unbalance the secondary pointer initially (or by other means than gravity) and to oppose this with a simple, unidirectional motor response such as by a solenoid and armature to establish registry of the secondary with the primary system.

A further purpose is to utilize gravity unbalance of the secondary pointer (or gravity equivalent) to indicate a nonoperative condition by pointer movement to an off scale position.

A further purpose is to off-set the motor response from the electrical null balance by the gravity or equivalent unbalance to preload the system in one direction and thereby eliminate lost motion which is characteristic of operation in either direction from the mean position of true balance.

Figure 4 is an adjustment diagram illustrating the principles of the invention.

Figure 5 is a diagram plotting amplifier output in volts across the motor coil as ordinate against displacement of the secondary indicator with respect to the primary indicator.

Figure 6 is a diagram similar to Figure 5 but illustrating different conditions.

Figure 7 is a view similar to Figure 4 illustrating different conditions.

Figure 1:
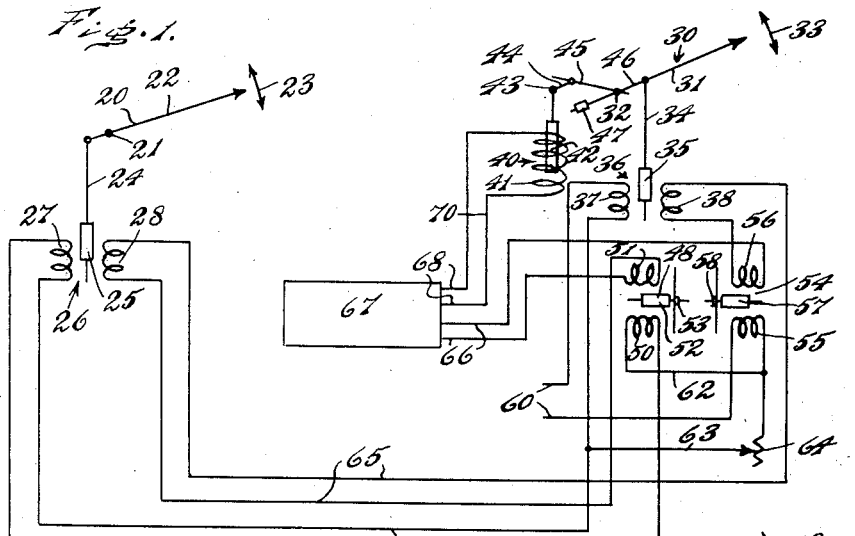
Figure 1 is a circuit diagram showing a preferred embodiment of the invention.

Describing in illustration but not in limitation and referring to the drawings:

A wide variety of hollow core transformer and differential transformer circuits have been used to reproduce movement of a primary indicator at a remote point through null positioning of a movable magnetic armature or core connected to the secondary indicator to agree with the similar positioning of the primary indicator at the point of electrical equilibrium.

In these systems generally, the response to maintain null relations may be secured by reference to the primary or secondary circuits by amplifying the unbalanced signal to operate the secondary indicator with a view to re-establishing null relations, under which conditions the primary and secondary indicators are in agreement. Various amplifiers have been used for this purpose, including vacuum tubes, magnetic amplifiers and transistors, etc.

These systems have in some cases been unidirectional and in other cases two directional. In a pure null system, the magnitude of the unbalanced current, voltage, or phase shift may initiate the follow-up response to reduce the differential to a minimum approaching zero. Such systems, where two directional, have what may be called a floating response, since the secondary indicator would remain at the last indicator position if for any reason signal communication from the primary indicator were interrupted.

In accordance with the present invention, unlike prior art systems, the system does not reach an electrical null between transmitter and receiving units when it is in balance, but instead operates under the force provided by amplified signals of reference transformers, which are opposed by the combined output signals from the transmitting and receiving transformers.

In the preferred embodiment, the pointer of the secondary indicator is initially urged toward one end of the scale by a biasing force which may be that of gravity, a spring or a combination of the two producing a force less than the repositioning force developed from the remote system. The position of electrical balance therefore is always offset from the null by the amount required to produce the balancing signal to cancel the biasing force. In the event that instrument failure or interruption of power occurs, the pointer of the secondary indicator will move to the end of the scale under the biasing force. By increasing the initial unbalance of the pointer of the secondary indicator, to a value of approximately half the maximum positioning force developed for the pointer, so as to give equal positioning accelerations in both directions, the positioning force need only operate in one direction and the motor can be simplified to utilize a one-way electrical motor such as a solenoid.

In accordance with the invention, fixed but adjustable reference transformers such as 48 or 54 later referred to (Figures 1 and 2) are employed which not only serve as null reference standards, but also provide a simple and inexpensive means for adjusting for range correlation and for zero position by core positioning in the coils. It is thus possible to avoid the use of highly accurate armatures and coils in relation to one another, and avoid fine mechanical compensating adjustments, close control of transformer turns, and in effect substitute electrical compensation for all of these variables which may be introduced.

Considering first the circuit of Figure 1, I illustrate a primary indicator 20 turning about a shaft 21 having a pointer 22 suitably counterweighted, moving over a scale 23, and suitably connected by a pivotally connected push-and-pull rod 24 with a movable magnetically susceptible armature or core 25 of magnetically susceptible material which moves in and out in a transmitting transformer 26 having a primary winding 27 and a secondary winding 28, the two windings preferably being bifilar as later explained. The pivotal connection of the push-and-pull rod 24 is on the opposite side of the pointer 22 with respect to the pointer pivot 21.

At a suitable distance, which may be considerable, a secondary indicator 30 is located, having a pointer 31 pivoted on a pivot axis 32 and moving over a scale 33, the pointer being pivotally connected to a push-and-pull rod 34 which is connected to a movable magnetically susceptible armature or core 35 of a receiving transformer 36 having a primary 37 and a secondary 38, the two coils preferably being bifilar as later explained.

A motor 40, in this case a solenoid having a coil 41 and a magnetically susceptible armature 42 is connected to the pointer in operative relation as by a pivotal connection at 43 to a crank 44 mounted on a shaft 45 which is on the pivot axis 32 and carries the pointer 31. The shaft is journalled on instrument bearings not shown.

It will be evident that in the form of the invention shown in Figure 1, the push-and-pull rod 34 acts on the pointer on a moment arm 46 which is opposed to the moment exerted by the crank 44, and that a counterbalancing force is applied to the system by a counterweight 47 acting oppositely to the moment of the pointer, but that the resultant of these moments produces a torque which tends to carry the pointer by gravity to one limiting position, in this case in the preferred embodiment the lower position. It will, of course, be evident that in designing equipment of this character, the designer is free to employ other suitable combinations of moments, desirably, however, producing a resultant which will bring the pointer to one limiting position whether by the action of gravity or by spring action.

It will also be noted that the push-and-pull rods 24 and 34 are connected to their respective pointer shafts on opposite moment arms, so that with pointers moving in the same direction, you have armature movements in opposite directions.

The secondary indicator is biased to move to one limiting position of the scale suitably the bottom, in case of power failure or other failure in the operating mechanism. In the simplest form as shown, this is accomplished by the relative weight of the armature 35 and the armature 42, which under the action of gravity tend to restore the pointer of the secondary indicator to the bottom of the scale in case of failure. It will be evident, however, that this biasing action can be accomplished by a spring, supplementing the gravitational force or opposing it as desired. In any case the pointer is biased to return to one limiting position where communication or power fail.

One basic feature of the invention is that when the pointers are adjusted to a position of unison, and a change in position occurs in response to motion of the primary indicator, whenever the armature or core 25 of the transmitting transformer moves into its coils the armature or core 35 of the receiving transformer moves out of its coils, and vice versa.

A range adjustment reference transformer 48 of Figure 1 which has a primary 50, and a secondary 51, the two being preferably bifilar as later explained, has an adjustable core 52, which moves in and out and is set at a fixed position by a screw and nut adjustment 53.

The circuit also includes a zero adjusting reference transformer 54 having a primary 55, a secondary 56 and an adjustable core 57, which is set in a fixed position by a screw adjustment 58. Primary and secondary in this case are also preferably bifilar. Thus the two reference transformers acting together additively in series provide the secondary reference output which is opposed by the output of the secondary coils 28 at the transmitter and 38 at the receiving instrument acting in the same direction.

An alternating current power source is connected at 60, suitably of 6 volts and 60 cycles, to a primary circuit 61 which includes the primary 27 of the transmitting transformer, the primary 37 of the receiving transformer, the primary 50 of the range adjusting reference transformer and the primary 55 of the zero adjusting reference transformer, all of these primaries being in series.

In the preferred embodiment, the circuit branch 62 including primary 50 of the range adjusting reference transformer and primary 27 of the transmitting transformer is shunted by a shunt circuit branch 63 including a variable resistor 64 to aid in alignment of the equipment.

The secondary circuit 65 connects all of the transformer secondaries in series to input terminals 66 of amplifier 67. The polarities are important as the secondary 28 of transmitting transformer 26 and the secondary 38 of receiving transformer 36 are connected in one direction and are opposed by the secondary 51 of the range adjusting reference transformer 48 and the secondary 56 of the zero adjusting reference transformer 54. Of course this opposition of output of the transformers can be obtained by opposing the primaries rather than opposing the secondaries.

The output 68 of the amplifier which is proportional to the signal unbalance in one direction is fed by a circuit 70 to the terminals of solenoid coil 41.

Figure 2:
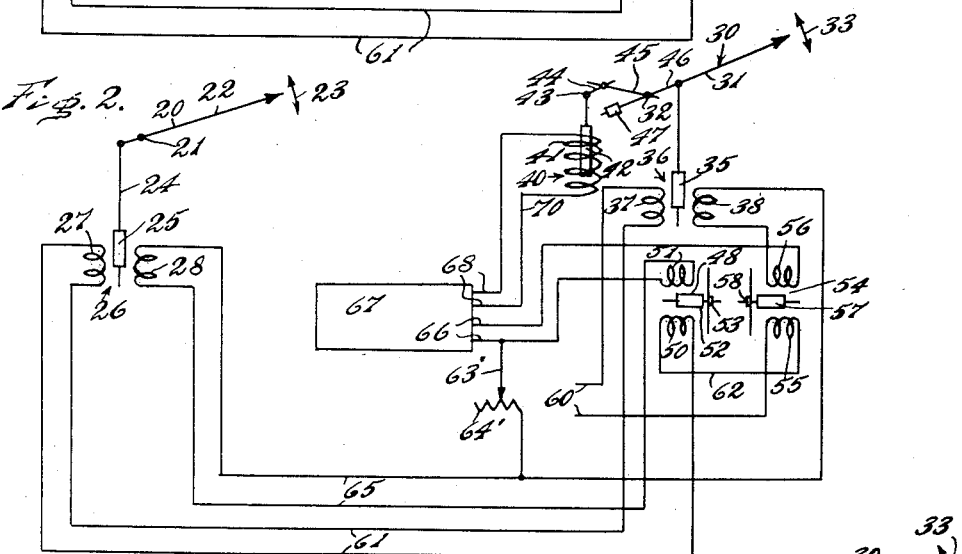
Figure 2 is a circuit diagram showing a variation in the circuit of Figure 1.

With reference to Figure 1 or 2 which can be assumed to represent response in calibrated relationship between transmitter and receiver units, operation can be explained as follows: If the primary actuation moves pointer 22 upward over scale 23, the core 25, being attached on the other side of the pivot 21, will move downward into the transformer coil 26. This will increase the secondary signal output of coil 28 and by amplification increase the output of the motor coil 41 in excess of that required to maintain pointer 31 in position against gravity unbalance. The pointer 31 will therefore move upward in response to the increased motor coil force, and as it does so core 35 will move upward and out of the transformer 36. This counteracts the original signal increase from secondary coil 28 and restores the total output from the secondaries 28 and 38 essentially to the previous value corresponding to equilibrium relationship with the reference transformer outputs and the gravity unbalance of the pointer. If the transmitting pointer 22 moves downward, the core 25 moves upward, which reduces the secondary signal and the amplified output to the motor coil 41. This permits pointer 30 to drop correspondingly until the core 35 enters far enough into the transformer to restore the signal strength from the combined transmitter and receiver secondaries.

Figures 1A, 3:
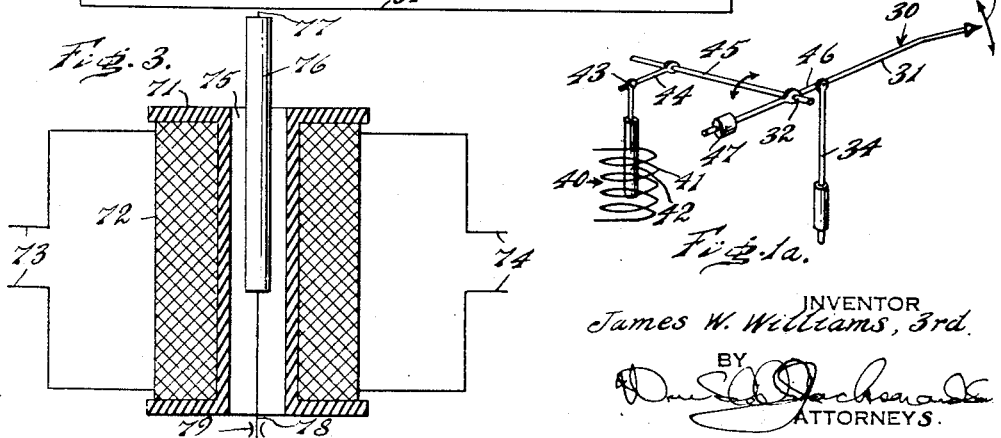
Figure 1a is a fragmentary perspective of a portion of Figure 1.
Figure 3 is an axial section through one of the hollow core transformers employed in the present invention.

Figure 3 shows a section through one of the transformers, which may be one of the moving armature or core transformers, or one of the fixed but adjustable core transformers.

This shows an electrically insulating transformer coil form 71 of generally spool-like character which receives bifilar windings 72 consisting of the primary and the secondary coils wound together at the same time in mechanical wire relationship to one another, with leads 73 to the primary and leads 74 to the secondary. A hollow interior 75 at the axis provides space through which a magnetically susceptible armature or core 76 moves (in the moving armature forms), or is adjusted (in the fixed core forms), suitably supported on a push-and-pull rod or suspension 77 and suitably provided with a trailer connection 78 which where desired may connect to a supplemental biasing spring (not shown) and is guided to maintain the core at the center by guide 79.

When properly adjusted, pointer travel of both the primary indicator and the secondary indicator is so related to the position of the cooperating armature that at mid-scale the armatures extend approximately half way through the coils. This is important not only from the standpoint of balancing the total output to approach null, but also to take advantage of the nearly linear incremental change in output of each transformer as the entering end of the armature moves through the middle third of the transformer coil length. Good results have been obtained experimentally using armature coils having a length of approximately three-quarters of an inch, with a maximum armature travel of slightly less than three-sixteenths of an inch. This leaves about one-sixteenth of an inch tolerance for positioning between the best linear response range of the coil, with some additional permissible travel beyond this range.

The moment arm of the primary indicator structure in the preferred embodiment has been made approximately 10 percent greater than that of the secondary indicator armature to facilitate range adjustment as described below.

With the equipment assembled and operating as shown in Figure 1, the alignment of the indicators can be initially accomplished or rechecked as follows:

(1) The shunt resistor 64 is bridged or shorted out, so that the shunt 63 has minimum resistance. Then the adjustable armature 57 of the zero positioning reference transformer is adjusted until the secondary indicator pointer is at the top of its scale, thus establishing its zero position.

(2) Next the shunt resistor 64 is adjusted to place its full resistance in the circuit. The core or armature 52 of the range adjusting reference transformer is then adjusted, with the primary indicator pointer at the top of the scale, to bring the second indicator pointer also to the top of the scale, so that both pointers are in unison and are zeroed together.

(3) The primary indicator pointer is then moved down the scale to the lowest extreme, and the shunt resistor 64 is adjusted until the secondary indicator pointer is brought to the same position at the bottom of the scale as that assumed by the primary indicator pointer.

If desired, the above adjustment may be checked by moving the primary indicator to various positions and checking the secondary indicator pointer to be sure that it reaches a corresponding position. If discrepancies appear the above adjustment steps should be repeated until the pointers move in unison.

The initial positioning of the armatures in the receiving transformer and in the zero adjusting reference transformer correspond to entering the leading end of the armature about half way into the coil. In total entering distance from the end of the coil this is equivalent to about 250 percent of the movement for full scale pointer travel in the preferred form. Since the actual entering distance of the armature varies with tolerance of the parts, this entering distance is being designated as C.

In an actual embodiment of the device of Figure 1, the transformers had primaries and secondaries in each case of 430 turns of No. 34 wire, with a resistance of 14 ohms. They operated under a primary impressed voltage of 6 volts at 60 cycles.

The adjustable resistor 64 had a full resistance of 300 ohms.

The amplifier employed has a large gain, and an output of 1½ watts.

In Figure 4 the travel of the receiving transformer armature into its coils and the travel of the transmitting transformer armature out of its coils is plotted above the null reference. The opposing effect of the adjustment of the fixed armatures or cores into the reference transformers is plotted below the null reference line. The gravity unbalance of the secondary indicator pointer in terms of its amplified transformer signal, in this case equivalent to 10 percent of the pointer scale displacement or 0.015 inch of armature travel, is added to the value of C, previously defined, contributed by the zero adjusting reference transformer in the downward direction.

During the initial zeroing adjustment, the value of C in the downward direction is adjusted for the existing value of C for the receiving transformer as determined by the assembly relation of the armature to the transformer coil in the particular case. It should be noted that the transformer equivalent of the gravity unbalance which is added to the effect of the zero adjusting reference transformer is balanced by an armature movement of 0.015 inch in addition to the entering armature distance C in this particular example. This is equivalent to 10 percent of scale movement of the pointer of the secondary indicator. This adjustment is accomplished by shunting the transmitting transformer and the range adjusting reference transformer out of the circuit and moving the armature or core of the zero adjusting reference transformer to a position where the receiving instrument pointer remains in balance at the upper limit of the scale reading.

Line R plotted on Figure 4 shows the armature movement in the receiving transformer in relation to pointer movement from high to low indication points on the scale. Line T on the same figure shows the corresponding relation for the transmitting transformer structure. The difference between the two results from a difference in moment arms of the armature suspensions in the respective instruments and allows for adjustment to accomplish exact correspondence.

For accurate calibration, the two lines R and T must be brought into correspondence and the total effective signal from the transmitting and receiving transformers remains a constant with the signal variation from movement of the armature of the transmitting transformer exactly offsetting the signal variation from movement of the armature of the receiving transformer over a corresponding distance. Thus it will be evident that continuous motor balance in response to the combined signal output of the transmitting transformer and the receiving transformer with respect to the fixed signal output from the reference transformers requires constant establishment of indicator agreement, of the secondary indicator with respect to motion of the primary indicator.

Thus where in operation the shunt resistance is increased and the armature of the range adjusting reference transformer is adjusted to obtain agreement of the primary and secondary indicator pointers at the high position of the scale, the total output values of the receiving and transmitting transformers are balanced by the opposed total output values of the two reference transformers plus the effect of the biasing force, in most cases gravity. When the change in position of the transmitting instrument pointer occurs, however, the movement of the primary indicator and the secondary indicator is different in proportion to the difference in the lines T and R, and, for the relation shown, when the transmitting power is at N for example, the receiving pointer will indicate at N. The reduction of the shunt resistance at 64 will tend to bypass an increasing amount of the energizing current from the primary of the transmitting transformer and the range adjusting reference transformer, thereby reducing the output of the secondaries of these transformers. Since this affects the transmitting transformer and the range adjusting reference transformer equally, it will not affect the previously established balance significantly, but does permit a proportional lowering of the slope of line T until the adjustment is reached which develops complete correspondence with the line R. Although the difference between T and R has been discussed in terms of 10 percent of scale difference, this will vary from instrument to instrument in accordance with variations in power, but an adjustment point can be obtained which will bring these differing values into accurate correspondence.

In the circuit of Figure 1, the shunt extends across the primary of the transmitting transformer and the range adjusting reference transformer which are connected in series. A similar adjustment can be made by placing a shunt resistor in a shunt 63' across the secondaries of the same transformers connected in series as shown in Figure 2. In the circuit of Figure 2, the resistor 64' functions similarly to the resistor 64 in Figure 1 except that it operates on the secondary.

It has been established by test of the embodiment above referred to, that with a B battery voltage of 230 volts on the amplifier, the amplifier develops a mean maximum potential across the solenoid motor coil of about 180 volts with large deviations between transmitting transformer and receiving transformer armature positions. It was noted also that with a movement of the primary indicator pointer equal to 10 percent of the scale range, a differential of 80 volts appeared across the motor coil when the pointer of the secondary indicator was held at the original equilibrium position. A movement of the primary indicator pointer of one percent of the scale, while the pointer of the secondary indicator was held at its original position, produced a voltage of about ten volts across the motor coil as compared to a linear average of 8 volts as proportioned from the ten percent scale offset above referred to. Since the departure from linearity is not great, an 8 volt increment change for one percent of scale deviation can be assumed from the standpoint of conservative analysis.

As previously explained, in the particular embodiment under discussion the receiving transformer armature travels through an axial distance of about 0.152 inch for full scale movement, and the mean pointer unbalance for fail-safe performance as well as gravity response in the downward pointer direction is equivalent to motor coil response from a mean potential of about 90 volts across the coil.

If we let $B_1$ be the secondary signal voltage corresponding to a particular position of the armature in the transmitting transformer, and $B_2$ be the secondary signal voltage corresponding to a particular position of the armature in the receiving transformer, $S_v$ equals the sum of the secondary voltages of the transmitting and receiving transformers and $S_c$ is the sum of the secondary voltages of the reference transformers, then $$S_v = S_c$$

for the null position and $$B_1 = S_v - B_2 \text{ or } B_1 = S_c - B_2$$

Figure 5 shows the approximate displacement of the secondary indicator pointer with respect to the true null reference in terms of amplifier motor output and the incremental change in E.M.F. on the motor coil with the secondary indicator pointer deviations from the equilibrium position with respect to the primary indicator. This diagram shows relative armature travel in turns of percent of a full scale movement as well as actual armature movement, against amplifier output in volts at the solenoid motor terminal. It also shows as a reverse ordinate the magnitude of an equivalent gravity unbalance in terms of amplifier output. It will be evident that in the particular example given, the secondary pointer displacement from true null to counteract the pointer unbalance at the equivalent of 90 volts effective at the motor coil is about seven percent of full scale. This is a considerable excess over that required to fulfill fail-safe requirements but is necessary to obtain quick downward response to lowering level comparable to upward motor response.

In the particular example, normally a five volt change in amplifier output or its equivalent of one half percent of scale differential will initiate pointer movement to a new position of balance and the excess margin for positional follow-up under normal restraint is therefore considerable, being of the order of about 20 to 1. This margin will serve to minimize the influence of any adverse effect which causes retardation, and allows for possible actuation of auxiliary controls or equipment from the secondary indicator where it is desirable, as in the case of opening and closing switching.

As well known, a simple unidirectional solenoid motor coil normally develops a variable response with change in armature position in the motor coil. This can be measured in terms of voltage required across the coil to maintain balance of the pointer at various positions on the scale. If this variation approaches linearity, the effect cancels out due to the calibration procedure, and this constitutes another advantage since it provides for automatic compensation for the variable output of this simple motor coil, thus gaining the advantage of its economy and simplicity over more complex motor systems without sacrifice in accuracy.

Figures 6 and 7 show that a constantly increasing voltage requirement across the motor coil for maintenance of balance as the output pointer moves from high to low requires a constantly increasing differential on the output pointer position from the true null relation with respect to the primary indicator pointer.

The shunt resistance adjustment automatically provides for this in the calibration procedure as previously described.

It will be noted that in this case the slope of the lines R and T do not correspond but differ in relation to the changing amplified signal strength required to position the pointer. In other words the secondary indicator pointer departure from true null includes a constantly increasing or decreasing variable as well as the basic constant equivalent of the unbalance. The constant is compensated for by the adjustment of the zero adjusting reference transformer armature as previously explained, and the variable is of the same order as the range calibration function and is compensated out by the adjustment of the shunt resistance.

The amplifier voltage response at the motor coil with respect to displacement of the secondary indicator pointer from equilibrium position as shown in Figure 6 requires about four percent of scale movement in the particular embodiment to take care of the required voltage differential to maintain the pointer position at equilibrium with the gravity unbalance at progressive points along the scale. In the particular example, the condition of balance is established at position N, where the output of the amplifier is about 90 volts, while position H corresponds to an amplifier output of about 70 volts and position L corresponds to an amplifier output of about 110 volts.

Figure 7 shows that if the slope of the line T by adjustment of the setting of the resistance in the shunt to develop an equilibrium signal strength at 96 percent of scale movement toward H, while the line R is at 100 percent of scale or at H, the four percent differential provides for the progressive overtravel of the transmitting pointer to develop the required increase in amplifier voltage with movement toward H in order to establish agreement with the pointer of the primary indicator. This shows that the system is very flexible to adjust for factors which permit the use of simple components, which could not be used were it not for the correcting means here available. The simple correlation of the functions and the very simple mechanism involved not only makes it possible to employ inexpensive equipment, but also assures that maintenance cost can be reduced to a minimum.

It will be evident that the primary indicator of the present invention may be a liquid level gauge or pressure gauge of the character shown in Kinderman U.S. Patent No. 2,509,644, granted May 30, 1950, for Differential Pressure Gauge, or it may be any other suitable type of primary indicator whose shaft or other moving element can be connected to the armature of the transmitting transformer.

It will be evident that any suitable type of amplifier can be employed for the purposes of the present invention.

It will be evident that, in accordance with the present invention, while the armatures of the transmitting transformer and the receiving transformer move in the opposite direction with respect to the transformer coils to maintain a fixed signal output by motor response, nevertheless the primaries and the secondaries of the transmitting and receiving transformers are placed or connected in series and in the same direction.

It will be evident that the motor coil in the present invention provides a force which is opposed by a constant bias or urge afforded by gravity, springs or otherwise.

It also will be evident that the spring reaction may vary according to any desired law to obtain the desired calibration relationship for the scale of the secondary indicator.

It will further be evident that the signal produced by the secondaries of the transmitting transformer and the receiving transformer is opposed by the signals produced by the secondaries of the reference transformers, but that the reference transformer outputs are adjusted by adjustment of the fixed positions of the reference transformer armatures.

It will further be evident that one of the reference transformers functions as a zero adjusting transformer and the other as a range adjusting transformer.

It will also be evident that the adjustment of the resistance in the shunt across the series branch including one of the transmitting transformer coils and one of the range adjusting reference transformer coils gives a very effective and convenient adjustment, especially when used in connection with difference of armature movements in the transmitting and receiving indicators.

It will further be evident that the instrument tends to correct for normal line voltage fluctuations in view of similarity of the effect of such voltage fluctuations on the reference transformers and on the transmitting and receiving transformers as the case may be. Thus the system maintains its accuracy of indication during period of fluctuation of line voltage.

It will further be evident that the present invention accomplishes a null by the application of a physical force in addition to the electrical balancing force, avoiding many of the difficulties encountered in the usual electrical null systems operating on A.C. due to the effects of inductance, capacitance, reluctance and other variations which cause change in phase.

It will further be evident that the alternating current balancing forces in conjunction with the inertia of the secondary indicator system and the damping supplied by that system will assure that the secondary indicator will have a low amplitude mean vibrational energy, assuring that the secondary indicator pointer will remain at all times in relatively close conformity to the position of primary indicator pointer.

It will further be evident that the relative angular displacement of the lever arms actuating the respective armatures of the pointer assemblies can compensate for variable solenoid motor output with stroke by corresponding relative changes of the instantaneous rate of armature movement.

In view of my invention and disclosure variations and modifications to meet individual whim or particular need will doubtless become evident to others skilled in the art, to obtain all or part of the benefits of my invention without copying the structure and method shown, and I, therefore, claim all such insofar as they fall within the reasonable spirit and scope of my claims.

Having thus described my invention what I claim as new and desire to secure by Letters Patent is:

1. In a remote operating electrical system, a transmitting transformer having a primary, a secondary and a moving armature, a receiving transformer having a primary, a secondary and a moving armature, the armature of the transmitting transformer moving into its coils as the armature of the receiving transformer moves out of its coils and vice versa, reference transformer means having primary coil means, secondary coil means and fixed core means, electric circuit connections placing the primary of the transmitting transformer, the primary of the receiving transformer and the primary of the reference transformer means in series, and circuit connections placing the secondary of the transmitting transformer, the secondary of the receiving transformer and the secondary coil means of the reference transformer means in series, with the output of the transmitting transformer and the output of the receiving transformer electrically oriented in one direction and the output of the reference transformer means electrically oriented in the opposite direction.

2. In a remote electrical operating system, a transmitting transformer having a primary, a secondary and a moving armature, a receiving transformer having a primary, a secondary and a moving armature, a first reference transformer having a primary, a secondary and an adjustable fixed core, a second reference transformer having a primary, a secondary and an adjustable fixed core, electrical connections placing the primaries of the transmitting transformer, the receiving transformer and the two reference transformers all in series, and electrical connections placing the secondaries of the transmitting transformer, the receiving transformer and the two reference transformers all in series, with the outputs of the transmitting transformer and the receiving transformer electrically oriented in one direction and the outputs of the reference transformers electrically oriented in the opposite direction.

3. In a remote indicating system, a primary indicator, a transmitting transformer having a primary, a secondary, and a moving armature operatively connected and responsive to the primary indicator, a secondary indicator, a receiving transformer having a primary, a secondary and a moving armature operatively connected to the secondary indicator, the secondary indicator being responsive to said last named moving armature, the armature of the transmitting transformer moving into its coils as the armature of the receiving transformer moves out of its coils, and vice versa, a first reference transformer having a primary, a secondary and a core, a second reference transformer having a primary, a secondary and a core, an alternating current power source, first circuit means connected to the alternate current power source connecting the primaries of the transmitting, receiving and reference transformers all in series, an amplifier having an input and an output, second circuit means connecting the secondaries of the transmitting, receiving and reference transformers all in series to the input of the amplifier, with the outputs of the transmitting and receiving transformers electrically oriented in one direction and the outputs of the reference transformers electrically oriented in the opposite direction, and electric motor means operatively connected to the secondary indicator and connected to the output of the amplifier.

4. A system of claim 3, in combination with means for adjusting the relative positions of the cores of the first and second reference transformers in order to align the system.

5. A system of claim 3, in combination with means for adjusting the range of the system and means for adjusting the zero of the system independently of the means for adjusting the range.

6. A system of claim 3, in combination with shunt resistor means across the series branch including one of the coils of the transmitting transformer and a coil of the reference transformer next in order in the series.

7. A system of claim 3, in combination with a regulating resistor, and shunt means for placing the regulating resistor across the primaries of the transmitting transformer and the reference transformer next in the series.

8. A system of claim 3, in combination with a regulating resistor, shunt means for placing the regulating resistor across the primaries of the transmitting transformer and the regulating transformer next in the series, and adjusting means for changing the positions of the cores of the first and second reference transformer.

9. A system of claim 3, in combination with a regulating resistor and means for placing the regulating resistor in shunt across the series connected secondaries of the transmitting transformer and the reference transformer next in the series.

10. A system of claim 3, in combination with a regulator resistor, shunt means for placing the resistor across the series connected secondaries of the transmitting transformer and the reference transformer next in the series, and adjusting means for changing the position of the cores of the first and second reference transformers.

11. A system of claim 3, in combination with biasing means urging the secondary indicator toward one limiting position, and opposed by the drive of the motor.

12. A system of claim 3, in which the motor constitutes a solenoid.

13. A system of claim 3, in which the motor constitutes a solenoid, in combination with biasing means urging the secondary indicator toward one limiting position.

14. A system of claim 3, in which the motor constitutes a solenoid, and gravity means for biasing the secondary indicator toward one limiting position.

15. A system of claim 3, in which the motor constitutes a solenoid, in combination with counterweighting means urging the secondary indicator towards its lowermost position and effective to carry the pointer to the lowermost position when an inoperative condition occurs.

16. An indicating system of claim 3, in which the windings of the transformers are bifilar.

17. In a remote indicating system, a primary indicator having a pointer, a transmitting transformer having a primary, a secondary and a moving armature operatively connected to and responsive to the position of the primary indicator and which for particular change in pointer setting moves into the transmitting transformer, a secondary indicator, a receiving transformer having a primary, a secondary and a moving armature operatively connected to and responsive to the position of the secondary indicator and which for a corresponding change in secondary indicator pointer setting moves out of the receiving transformer, reference transformer means, having primary coil means, secondary coil means and core means, a source of alternating current, primary circuit connections from the source of alternating current in series through the primaries of the transmitting transformer, the receiving transformer and the reference transformer means connected, an amplifier having an input and an output, secondary circuit connections to the input of the amplifier in series through the secondaries of the transmitting transformer, the receiving transformer and the secondary coil means of the reference transformer means, the output of the transmitting transformer plus the receiving transformer opposing the output of the reference transformer means, and motor means connected to the output of the amplifier for moving the secondary indicator to maintain it in step with the primary indicator, the secondary indicator moving the armature of the receiving transformer into the receiving transformer as the primary indicator moves the armature of the transmitting transformer out of the transmitting transformer and vice versa.

18. In a remote indicating system, a primary indicator having a pointer, a transmitting transformer having a primary, a secondary and a moving armature operatively connected to and responsive to the motion of the primary indicator, a secondary indicator having a pointer, a receiving transformer having a primary, a secondary and a moving armature operatively connected to and responsive to the action of the secondary indicator, a range adjusting reference transformer having a primary, a secondary and an adjustable core, a zero adjusting reference transformer having a primary, a secondary and an adjustable core, a source of alternating current, circuit means connecting the source of alternating current in series to the primaries of the transmitting transformer, the receiving transformer, the range adjusting reference transformer and the zero adjusting reference transformer, the outputs of the transmitting transformer and the receiving transformer being connected in the same direction and the outputs of the range adjusting reference transformer and the zero adjusting reference transformer being connected oppositely thereto, motor means operatively connected to the secondary indicator and connected to the output of the amplifier, said motor means adjusting the pointer of the secondary indicator so as to bring the core of the receiving transformer into the receiving transformer when the core of the transmitting transformer is moving out of the transmitting transformer, and vice versa, a resistor, and means for shunting the resistor across the series branch including one of the coils of the range adjusting reference transformer and one of the coils of the transmitting transformer in series.

19. In a remote indicating system, a primary indicator having a pointer, a transmitting transformer having a primary, a secondary and a moving armature operatively connected to and responsive to the motion of the primary indicator, a secondary indicator having a pointer, a receiving transformer having a primary, a secondary and a moving armature operatively connected to and responsive to the motion of the secondary indicator, a range adjusting reference transformer having a primary, a secondary and an adjustable core, a zero adjusting reference transformer having a primary, a secondary and an adjustable core, a source of alternating current, circuit means connecting the source of alternating current in series to the primaries of the transmitting transformer, the receiving transformer, the range adjusting reference transformer and the zero adjusting reference transformer, the outputs of the transmitting transformer and the receiving transformer being connected in the same direction and the outputs of the range adjusting reference transformer and the zero adjusting reference transformer being connected oppositely thereto, motor means operatively connected to the secondary indicator and connected to the output of the amplifier, said motor means adjusting the pointer of the secondary indicator so as to bring the core into the receiving transformer when the core of the transmitting transformer is moving out of the transmitting transformer, and vice versa, a resistor, and shunt means placing the resistor in shunt across the primary of the range adjusting reference transformer and the primary of the transmitting transformer connected in series.

20. In a remote indicating system, a primary indicator having a pointer, a transmitting transformer having a primary, a secondary and a moving armature operatively connected to and responsive to the motion of the primary indicator, a secondary indicator having a pointer, a receiving transformer having a primary, a secondary and a moving armature operatively connected to and responsive to the motion of the secondary indicator, a range adjusting reference transformer having a primary, a secondary and an adjustable core, a zero adjusting reference transformer having a primary, a secondary and an adjustable core, a source of alternating current, circuit means connecting the source of alternating current in series to the primaries of the transmitting transformer, the receiving transformer, the range adjusting reference transformer and the zero adjusting reference transformer, the outputs of the transmitting transformer and the receiving transformer being connected in the same direction and the outputs of the range adjusting reference transformer and the zero adjusting reference transformer being connected oppositely thereto, motor means operatively connected to the secondary indicator and connected to the output of the amplifier, said motor means adjusting the pointer of the secondary indicator so as to bring the core into the receiving transformer when the core of the transmitting transformer is moving out of the transmitting transformer, and vice versa, a resistor, and shunt means connecting the resistor in the shunt across the secondary of the range adjusting reference transformer and the transmitting transformer connected in series.

21. The method of adjusting a remote indicator system, including a primary indicator operatively and responsively connected to the armature of a transmitting transformer, a secondary indicator operatively and responsively connected to the armature of a receiving transformer, first and second reference transformers having adjustable cores, the primaries of all of the transformers being connected in series to a power source, and the secondaries of all of the transformers being connected in series to the input of an amplifier whose output is connected to a motor operating the secondary indicator, the transmitting and receiving transformers opposing the reference transformers and the movable armature on the transmitting transformer moving in when the movable armature on the receiving transformer moves out of the coils, with shunt means for adjusting the voltage across a circuit branch including a coil of the transmitting transformer and one of the reference transformers in series, which comprises adjusting the shunt means to reduce its resistance to a minimum and then adjusting the core of the unshunted reference transformer to bring the pointer of the secondary indicator to one limiting position, adjusting the shunt means until its resistance is a maximum, and then adjusting the core of the shunted reference transformer until the pointers of both the primary and secondary indicators are in the same positions, moving the pointer of the primary indicator to the opposite limiting position and then adjusting the shunt means to bring the pointer of the secondary indicator to the other limiting position.

22. The method of adjusting a remote operating indicator system to bring the two pointers into agreement, said system consisting of a primary indicator, a transmitting transformer having its movable armature operatively connected and responsive to the primary indicator, a secondary indicator, a receiving transformer having its movable armature operatively connected and responsive to the secondary indicator, first and second reference transformers having adjustable cores, the primaries of all of the transformers being connected in series with a power source, the secondaries of all of the transformers being connected in series to the input of an amplifier, with the outputs of the transmitting and receiving transformers opposing the outputs of the reference transformers, the secondary indicator being biased toward one limiting position, and the output of the amplifier urging the secondary indicator in opposition to the bias, there being a resistor shunt across the series connected branch containing one of the transmitting transformer windings and one of the reference transformer windings, and the armature of the transmitting transformer moving into its windings while the armature of the receiving transformer moves out of its windings, which comprises adjusting the resistor to minimum resistance and then adjusting the position of the core in the reference transformer which is not shunted to bring the secondary indicator pointer to one end of the scale, then applying full resistance in the shunt and adjusting the position of the core of the reference transformer which is shunted to bring both the primary indicator and secondary indicator pointers into agreement at the one limiting position of the scales, then moving the pointer of the primary indicator to the other limiting position of the scale and adjusting the resistance in the shunt until the pointer of the secondary indicator reaches the other limiting position of the scale.

23. In a remote indicating system, a primary indicator, transmitting transformer means responsive to the primary indicator, a secondary indicator, receiving transformer means operatively associated with the secondary indicator, a motor device including a motor winding and a motor armature, the motor armature being associated with the secondary indicator in driving relation, reference transformer means operatively connected in circuit in opposition to the transmitting and receiving transformer means, amplifier means receiving as input the output of the circuit including said transformer means and connected at its output side to the motor coil, and means for biasing the secondary indicator toward one limiting position and thereby creating a restoring force on the secondary indicator, when equilibrium is disturbed by relative movement of the primary indicator to which the transmitting transformer means responds, the receiving transformer means being caused to adjust to a new position of mechanical and electrical equilibrium in which the next signal input to the amplifier means is just sufficient to maintain the receiving transformer means against the action of the means for biasing.

No references cited.